(12) United States Patent
Shimomura

(10) Patent No.: US 7,190,498 B2
(45) Date of Patent: Mar. 13, 2007

(54) OPTICAL SCANNING APPARATUS AND IMAGE FORMING APPARATUS USING THE SAME

(75) Inventor: Hidekazu Shimomura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/294,561

(22) Filed: Dec. 6, 2005

(65) Prior Publication Data

US 2006/0072201 A1 Apr. 6, 2006

Related U.S. Application Data

(62) Division of application No. 10/624,544, filed on Jul. 23, 2003, now Pat. No. 7,068,406, which is a division of application No. 10/041,463, filed on Jan. 10, 2002, now Pat. No. 6,760,138.

(30) Foreign Application Priority Data

| Jan. 11, 2001 | (JP) | ............................. 2001/003814 |
| Jan. 11, 2001 | (JP) | ............................. 2001/003815 |
| Dec. 26, 2001 | (JP) | ............................. 2001/394085 |

(51) Int. Cl.
*G02B 26/08* (2006.01)

(52) U.S. Cl. .................................................. 359/205

(58) Field of Classification Search ............... 359/196, 359/197, 205, 206, 212, 216; 347/261
See application file for complete search history.

(56) References Cited

U.S. PATENT DOCUMENTS 4,435,041 A 3/1984 Torok et al. ........... 350/162.24
4,917,447 A 4/1990 Newnam ..................... 350/1.1
4,977,417 A * 12/1990 Takanashi et al. .......... 347/135

(Continued)

FOREIGN PATENT DOCUMENTS

EP 816894 1/1998

(Continued)

OTHER PUBLICATIONS

English language translation of Argument Against Opposition in Japanese counterpart Application No. 2001-394085.

(Continued)

*Primary Examiner*—Euncha P. Cherry
(74) *Attorney, Agent, or Firm*—Fitzpatrick, Cella, Harper & Scinto

(57) ABSTRACT

A scanning optical system using a short-wavelength light of 500 nm or less uses a reflecting mirror having a higher absolute reflectivity and having reduced wavelength and angle dependences. Divergent ray of light emitted from a semiconductor laser is converted into an approximately parallel light beam by a collimator lens and the diameter of the light flux is reduced by an aperture before travel to a polygon mirror. The light beam from the polygon mirror passes through scanning lenses to form a small spot at any point in the entire scanning area. The semiconductor laser is a gallium nitride semiconductor laser having an oscillation wavelength of 408 nm. The polygon mirror has such a characteristic that, if the complex refractive index N of a metallic film contributing to a reflection characteristic of the reflecting mirror is defined as $N(\lambda)=n(\lambda)-ik(\lambda)$, then $k(\lambda) > \sqrt{(-n(\lambda)^2+18n(\lambda)-1)}$ is satisfied.

8 Claims, 15 Drawing Sheets

U.S. PATENT DOCUMENTS

| | | | |
|---|---|---|---|
| 5,355,244 A | 10/1994 | Suzuki et al. | 359/212 |
| 5,438,446 A | 8/1995 | Brandt | 359/196 |
| 5,604,620 A | 2/1997 | Osano et al. | 359/196 |
| 5,940,200 A | 8/1999 | Iizuka | 359/206 |
| 6,233,081 B1 | 5/2001 | Suzuki et al. | 359/212 |
| 6,473,233 B1 | 10/2002 | Iizuka | 359/566 |
| 6,670,980 B1 * | 12/2003 | Ori | 347/261 |
| 2001/0038484 A1 | 11/2001 | Harada | 359/204 |

FOREIGN PATENT DOCUMENTS

| | | |
|---|---|---|
| EP | 1139142 | 10/2001 |
| JP | 5-164982 | 6/1993 |
| JP | 5-303049 | 11/1993 |
| JP | 11-81911 | 10/1999 |
| JP | 2000-352680 | 12/2000 |
| JP | 2001-310497 | 11/2001 |

OTHER PUBLICATIONS

English language translation of Transmittal Notification of Opposition in Japanese counterpart Application No. 2001-392085.

English language translation of Notification of Reason for Refusal of Correction in Japanese counterpart Application No. 2001-392085.

English language translation of Notification of Reasons for Revocation regarding Japanese counterpart Application No. 2001-392085.

* cited by examiner

S-POLARIZED LIGHT

P-POLARIZED LIGHT

S-POLARIZED LIGHT

P-POLARIZED LIGHT

S-POLARIZED LIGHT

P-POLARIZED LIGHT

OPTICAL SCANNING APPARATUS AND IMAGE FORMING APPARATUS USING THE SAME

This application is a division of application Ser. No. 10/624,544, filed Jul. 23, 2003, now U.S. Pat. No. 7,068,406 which was a division of application Ser. No. 10/041,463, filed Jan. 10, 2002, which issued as U.S. Pat. No. 6,760,138 on Jul. 6, 2004, the contents of which are incorporated herein by reference.

BACKGROUND OF THE INVENTION

1. Field of the Invention

The present invention relates to an optical scanning apparatus used in an image forming apparatus such as a laser printer, a digital copying machine, or a multifunction printer.

2. Related Background Art

Ordinarily, optical scanning apparatuses for use in these kinds of image forming apparatus operate in such a manner that a beam of light from a laser light source is deflected by a polygon mirror and travels through an imaging lens system to thereby form an imaging light spot on a surface to be scanned.

There are many cases where a semiconductor laser or the like is used as a laser light source in a manner described below. Divergent rays of light emitted from a laser light source are converted into an approximately parallel light beam by a collimator lens and the light beam is shaped by an aperture. The shaped light beam enters an imaging lens system after being deflected by a polygon mirror rotating at a constant angular velocity. It is required that the imaging lens system have an fθ characteristic to cause a scanning surface placed at a certain distance from the imaging lens system at a constant distance speed with the light beam deflected at a constant angular velocity by the polygon mirror. It is also required that the curvature of field be suitably corrected so that a small light spot can be formed at any point in the entire scanning area.

Ordinarily, the imaging lens system is arranged to have a tilt correction function for correcting a deviation of the scanning position in a direction perpendicular to a main scanning direction, i.e., in a sub-scanning direction, because the polygon mirror has an error in its mirror surfaces caused at the time of working for forming the surfaces, and because the rotating shaft of the polygon mirror vibrates. Therefore, the imaging lens system is formed as an anamorphic lens system having imaging characteristics differing between the main and sub-scanning directions.

Conventionally, the imaging lens system has lenses formed from a glass material so as to have a toric surface and a cylindrical surface. Such lenses have an antireflection coating formed thereon by vapor deposition or the like. In recent years, as such lenses, low-cost plastic lenses capable of being freely shaped to correct aberrations have ordinarily been used since working of glass lenses is difficult to perform and the working cost is high.

Semiconductor lasers conventionally used as light sources are infrared (780 nm) lasers and visible light (675 nm) lasers. Therefore, polygon mirrors or bending mirrors formed of copper mirrors having a high reflectance while having low wavelength dependence and low angle dependence have been used.

FIGS. 8A and 8B show reflectance characteristics of copper itself, and FIGS. 9A and 9B show reflectance characteristics of a conventional copper mirror which is formed in such a manner that a copper film is formed on an aluminum base member and alumina ($Al_2O_3$) and $SiO_2$ are vapor-deposited on the copper film. As can be understood from these figures, the mirror has improved reflection characteristics in the infrared laser and visible light laser wavelength bands.

Further, in response to demands for image forming apparatuses of higher resolution, the development of optical scanning apparatuses capable of forming a smaller shaped spot is being advanced.

However, it is apparent from FIGS. 8A, 8B, 9A and 9B that, with decreasing wavelength, the reflectance of the copper mirror decreases and its wavelength and angle dependences are also increased. In use of the copper mirror with a short-wavelength laser in the conventional system, it is necessary to increase the laser power or to use a collimator lens of a smaller F number in order to maintain a predetermined quantity of light. In such a situation, the load on the laser itself is considerably heavy and there are cost-increasing factors, e.g., an increase in the number of collimator lenses for suitably correcting aberrations.

In use of a semiconductor laser as a light source in a certain operational environment, variation in wavelength is inevitable because of a temperature-dependent oscillation wavelength characteristic of the laser. It is, therefore, required that variations in the optical characteristics, i.e., the transmittance, the reflectance, etc., of optical components used in the scanning optical system be small in the vicinity of the laser oscillation wavelength. While the copper mirror has a good characteristic with respect to infrared laser light and visible laser light, considerable fluctuation in light quantity, i.e., image density nonuniformity, results from the wavelength-dependent reflectance of the copper mirror.

Moreover, because of the angle dependence of the reflectance, the uniformity of image density between the scanning center and scanning end is far from sufficient for formation of a high-quality image.

In general, optical materials used for forming plastic lenses have such a transmittance characteristic that, with decreasing wavelength, the transmittance decreases due to absorption in the material. High-cost glass lenses have, therefore, been used in optical scanning apparatuses using short-wavelength light sources.

FIG. 15 shows a graph showing the transmittance of ordinary optical resins. Variation in the transmittance due to internal absorption in the vicinity of the oscillation wavelength (780 nm) of an infrared laser or the oscillation wavelength (675 nm) of a visible light laser conventionally used as a light source is negligibly small. In the case of use with a light source of a short wavelength in the vicinity of 400 nm, however, the reduction in transmittance due to internal absorption is not negligible. Also, since the ray passage distance in the plastic lens changes with respect to the image size, deterioration in image quality due to light quantity distribution nonuniformity at the position on the scanned image surface is more considerable than the reduction in absolute quantity of light.

Also, in use of a semiconductor laser as a light source in a certain operational environment, variation in wavelength is inevitable because of a temperature-dependent oscillation wavelength characteristic of the laser. It is, therefore, required that variations in optical characteristics, i.e., the transmittance, the reflectance, etc., of optical components used in the scanning optical system be small in the vicinity of the laser oscillation wavelength. In a case where a plastic lens is used in a short wavelength range in the vicinity of 400 nm, there is a problem of image density nonuniformity which, as can be understood from FIG. 15, results from variation in the quantity of light on the scanned surface due to the wavelength dependence of the transmittance.

SUMMARY OF THE INVENTION

In view of the above-described problems, an object of the present invention is to provide an optical scanning apparatus using a light source of a short wavelength not longer than 500 nm, and using a reflecting mirror having a high absolute reflectance and smaller wavelength and angle dependences.

Another object of the present invention is to provide an optical scanning apparatus in which light quantity distribution nonuniformity due to absorption in an optical resin is reduced to ensure image density uniformity.

In order to solve the above-mentioned problem, according to the present invention, there is provided an optical scanning apparatus in which a light beam from a light source is deflected and forms an imaging spot on a surface to be scanned, the apparatus comprising: the light source having a wavelength of 500 nm or less; and a reflecting mirror which reflects the light beam from the light source, wherein if a complex refractive index N of a metallic film contributing to a reflection characteristic of the reflecting mirror is defined as $$N(\lambda)=n(\lambda)-ik(\lambda)$$

where n, k>0;
$n(\lambda)$ is the real part of the complex refractive index;
$i=\sqrt{-1}$;
$k(\lambda)$ is the imaginary part of the complex refractive index (exhaustion factor); and
$\lambda$ is the wavelength, then the reflecting mirror satisfies a condition: $k(\lambda)>\sqrt{(-n(\lambda)^2+18n(\lambda)-1)}$.

That is, according to the present invention, in the scanning optical system in which the wavelength of the light source is 500 nm or less and a reflecting mirror is provided, a suitable metallic material for the reflecting mirror is selected to increase the absolute reflectance and to improve the wavelength dependent characteristic and the angle characteristic of the reflectance.

In order to solve the above-mentioned problem, according to the present invention, there is provided an optical scanning apparatus, comprising a deflection optical system which deflects a light beam from a light source, and a scanning and imaging lens system which forms an imaging spot on a surface to be scanned with the light beam from the deflection optical system, wherein the wavelength of the light source is 500 nm or less, and the scanning and imaging lens system has at least one plastic lens; and if the maximum and the minimum of the total ray passage distance of the plastic lens according to the deflection angle from the optical axis is Lmax and Lmin, respectively, then Lmax−Lmin<3°log$_{10}$0.93/S, and S=log$_{10}$(1−3.55×10$^8$/λ$^4$), where λ is the wavelength (nm) of the light beam.

Also, according to the present invention, there is provided an optical scanning apparatus, comprising a deflection optical system which deflects a light beam from a light source, and a scanning and imaging lens system which forms an imaging spot on a surface to be scanned with the light beam from the deflection optical system, wherein the wavelength of the light source is 500 nm or less, and the scanning and imaging lens system has at least one plastic lens, and an optical member having a spectral characteristic similar to the inverse of a wavelength characteristic of the transmittance of an optical resin used for the plastic lens.

That is, according to the present invention, in the scanning optical system in which the wavelength of the light source is 500 nm or less and at least one plastic lens is provided, a restriction is put on the selection of the thickness of the plastic lens to reduce nonuniformity of distribution of the quantity of light due to internal absorption in the optical resin, thus guaranteeing image density uniformity.

Also, an optical component having a characteristic similar to the inverse of the wavelength characteristic of transmittance of the plastic lens is provided to improve the stability of quantity of light even when the wavelength of the light source is changed in the operational environment.

DETAILED DESCRIPTION OF THE PREFERRED EMBODIMENTS

Embodiments of the present invention will be described below with reference to the accompanying drawings.

First Embodiment

Figure 1:
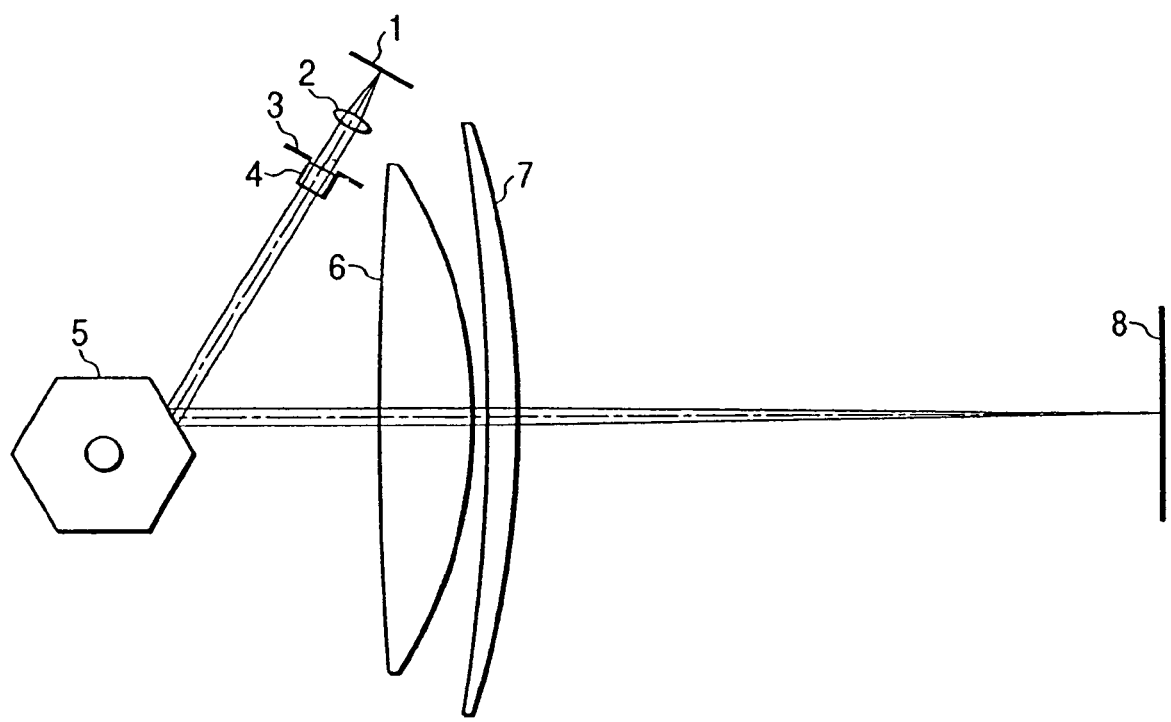
FIG. 1 is a schematic cross-sectional view of an essential portion of an optical scanning apparatus which represents a first embodiment of the present invention.

FIG. 1 is a schematic cross-sectional view of an essential portion of an optical scanning apparatus in which features of the present invention are best shown. Divergent rays of light from a semiconductor laser 1, i.e., a light source, are converted into an approximately parallel light beam by a collimator lens 2 and the diameter of the light flux is reduced by an aperture 3 to obtain a desired spot diameter. The semiconductor laser 1 used in this embodiment is a gallium nitride semiconductor laser having an oscillation wavelength of 408 nm. A rotary polygon mirror 5 is provided which reflects the light beam from the light source so that the light beam travels to a surface 8 to be scanned. The reflected light beam from the polygon mirror 5 passes through scanning lenses 6 and 7 to form a small spot at any point in the entire scanning area. It is required that the scanning lenses 6 and 7 have an fθ characteristic such that the light beam deflected at a constant angular velocity by the polygon mirror 5 is converted into a light beam moving at a constant distance speed.

Each of the scanning lenses 6 and 7 used in this embodiment may be made of either glass or a plastic. However, if the lens is made of a plastic, it is preferred that the lens satisfy conditions described below with respect to a fourth or fifth embodiment of the present invention: Lmax−Lmin<3°log$_{10}$0.93/S, and S=log$_{10}$(1−3.55×10$^8$/λ$^4$), where λ is the wavelength (nm) of the light beam.

It is also preferred that the lens alternatively satisfy the condition Lmax−Lmin<10.0 (mm).

Also, at least one of a bending mirror, a filter and an optical thin film vapor-deposited on an optical member, each of which is a member for correcting light quantity distribution nonuniformity in a sixth embodiment of the present invention, may be used in this embodiment.

Further, an optical member in a seventh embodiment having a characteristic (e.g., reflectance b of a bending mirror) similar to the inverse of the transmittance spectral characteristic of the optical resin may be used. This optical member having a characteristic similar to the inverse of the transmittance spectral characteristic of the optical resin may be a bending mirror, a filter, or an optical thin film vapor-deposited on an optical member.

The parallel light beam is temporarily condensed on the polygon mirror 5 along a sub-scanning direction by a cylindrical lens 4, and the polygon mirror 5 and the surface 8 to be scanned are set in an optically conjugate relationship with each other, thereby enabling correction of surface tilt of the polygon mirror 5.

The relationship between the complex refractive index and the reflectance of a metallic-film reflecting mirror will be described. If the complex refractive index N of a metallic film is defined as $$N(\lambda)=n(\lambda)-ik(\lambda)$$

where n, k>0;
n(λ) is the real part of the complex refractive index;
i=√−1;
k(λ) is the imaginary part of the complex refractive index (exhaustion factor); and
λ is the wavelength, then the reflectance R can be expressed as $$R=\{(n_0-n)^2+k^2\}/\{(n_0+n)^2+k^2\}$$

where $n_0$ is the refractive index of the incidence medium, ordinarily $n_0$=1.0.

This equation is expanded into $$R=1-4n/(k^2+n^2+2n+1)$$

and, when the lower limit of the reflectance of the metallic reflecting mirror used in the optical scanning apparatus is set to 0.8, $$1-4n/(k^2+n^2+2n+1)>0.8$$

$$k^2>-n^2+18n-1$$

$$k>\sqrt{(-n^2+18n-1)}.$$

Table 1 shows the complex refractive indices of typical metallic films with "A" representing the right side of the above inequality.

TABLE 1

| Wavelength | Al | | | Cu | | | Au | | | Ag | | | Cr | | |
|---|---|---|---|---|---|---|---|---|---|---|---|---|---|---|---|
| | n | K | A | N | K | A | n | K | A | N | k | A | N | k | A |
| 400 | 0.42 | 4.00 | 2.60 | 0.85 | 2.00 | 3.88 | 1.52 | 1.75 | 5.35 | 0.08 | 1.93 | 0.67 | 2.45 | 1.79 | 7.01 |
| 450 | 0.55 | 4.50 | 3.03 | 0.87 | 2.20 | 3.93 | 1.40 | 1.75 | 5.11 | 0.06 | 2.42 | 0.29 | 2.54 | 1.89 | 7.15 |
| 500 | 0.70 | 5.00 | 3.48 | 0.88 | 2.42 | 3.95 | 0.82 | 1.70 | 3.80 | 0.06 | 2.87 | 0.29 | 2.65 | 1.98 | 7.33 |
| 550 | 0.85 | 5.50 | 3.88 | 0.72 | 2.45 | 3.53 | 0.31 | 2.49 | 2.16 | 0.06 | 3.32 | 0.29 | 2.77 | 2.02 | 7.52 |
| 600 | 1.08 | 5.90 | 4.43 | 0.17 | 3.07 | 1.45 | 0.18 | 3.10 | 1.51 | 0.06 | 3.75 | 0.29 | 2.93 | 2.05 | 7.77 |
| 650 | 1.30 | 6.30 | 4.91 | 0.13 | 3.65 | 1.16 | 0.15 | 3.50 | 1.31 | 0.07 | 4.20 | 0.51 | 3.10 | 2.10 | 8.03 |
| 700 | 1.60 | 6.50 | 5.51 | 0.12 | 4.17 | 1.08 | 0.15 | 3.75 | 1.31 | 0.08 | 4.62 | 0.67 | 3.31 | 2.11 | 8.34 |
| 750 | 1.82 | 6.90 | 5.92 | 0.12 | 4.62 | 1.08 | — | — | — | 0.08 | 5.05 | 0.67 | — | — | — |
| 800 | 1.90 | 7.00 | 6.07 | 0.12 | 5.07 | 1.08 | — | — | — | 0.09 | 5.45 | 0.79 | — | — | — |

It can be understood from Table 1 that, in the case of copper (Cu), k>A and the reflectance is 80% or higher when the wavelength is on the longer wavelength side of 600 nm, and k<A and the reflectance is lower than 80% when the wavelength is on the shorter wavelength side of 600 nm. In the case of aluminum (Al) or silver (Ag), k>A when the wavelength is 400 to 800 nm. Therefore, even when a light source of 500 nm or less is used, it is possible to obtain a sufficient quantity of light by using aluminum or silver.

Table 2 shows the reflectance R of each metallic film with respect to a light flux having wavelength λ and striking the film perpendicularly to the plane of incidence.

TABLE 2

| Wavelength | Al | Cu | Au | Ag | Cr |
|---|---|---|---|---|---|
| 400 | 0.91 | 0.54 | 0.35 | 0.93 | 0.35 |
| 450 | 0.90 | 0.58 | 0.37 | 0.97 | 0.37 |

TABLE 2-continued

| Wavelength | Al | Cu | Au | Ag | Cr |
|---|---|---|---|---|---|
| 500 | 0.90 | 0.63 | 0.47 | 0.97 | 0.39 |
| 550 | 0.90 | 0.68 | 0.84 | 0.98 | 0.39 |
| 600 | 0.89 | 0.94 | 0.93 | 0.98 | 0.40 |
| 650 | 0.88 | 0.96 | 0.96 | 0.99 | 0.42 |
| 700 | 0.87 | 0.97 | 0.96 | 0.99 | 0.43 |
| 750 | 0.87 | 0.98 | — | 0.99 | — |
| 800 | 0.87 | 0.98 | — | 0.99 | — |

Figure 2A:
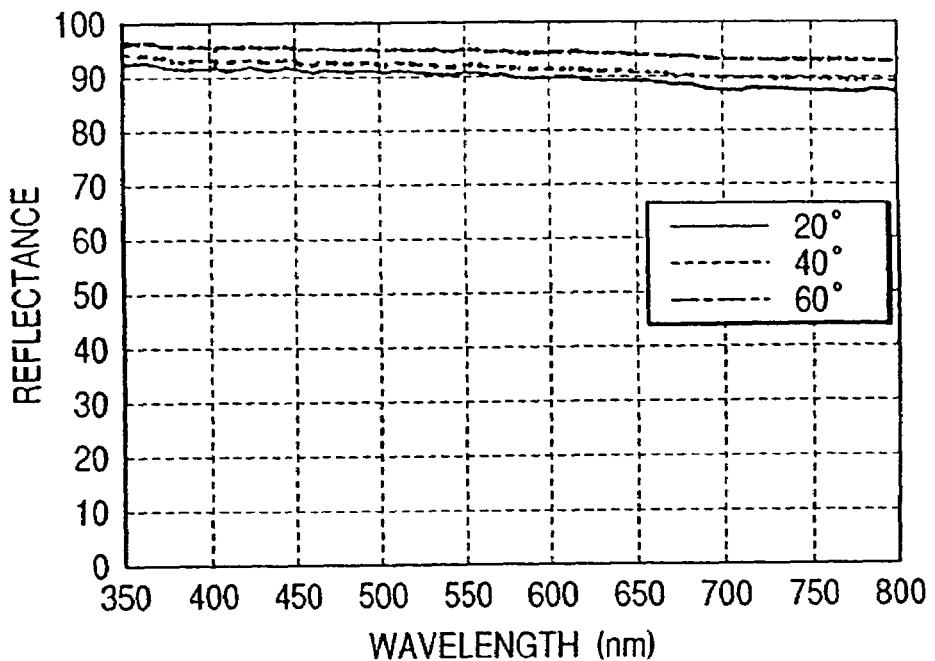
FIGS. 2A and 2B are diagrams showing the spectral reflectance of an aluminum mirror.
Figure 2B:
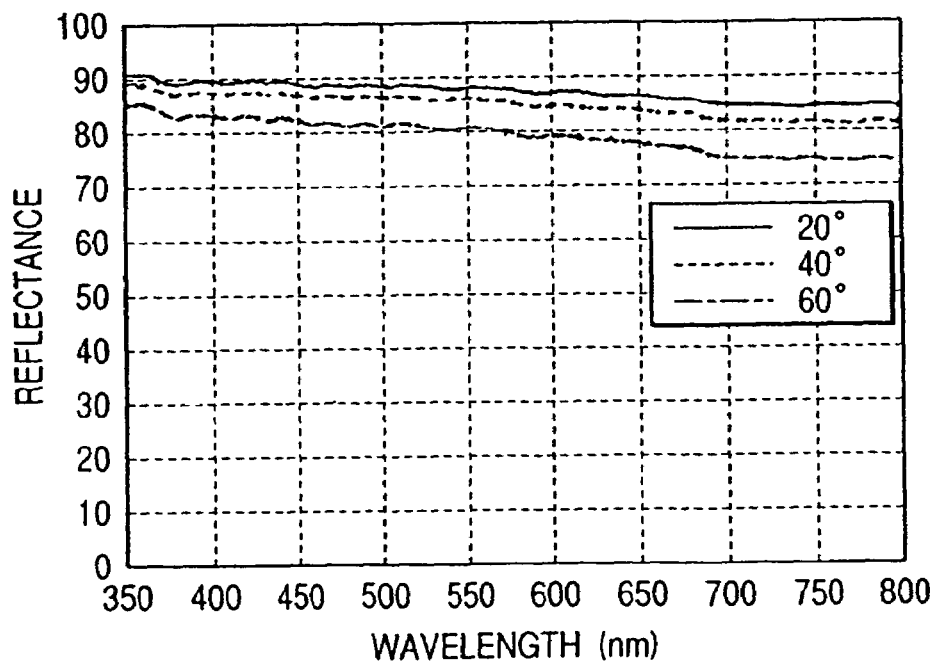

FIGS. 2A and 2B show the reflectance R of aluminum (Al) film with respect to S-polarized light, which is a wave component vibrating along a direction perpendicular to the plane of incidence, and P-polarized light, which is a wave component vibrating along a direction parallel to the plane of incidence, the light being incident at angles of 20°, 40°, and 60°.

An ordinary process in which an anodized film is formed on a surface of an aluminum base member will be described.

The polygon mirror used in this embodiment is formed by using a base member made of aluminum. Ten and several polygon blanks each corresponding to such a member are combined to form an anode, and undergo electrolysis in an electrolyte satisfying certain conditions (e.g., boric acid), the electrolysis being performed at a voltage of 30 to 40 V for 5 to 10 seconds. An oxide film is thereby formed on the blank surfaces. This alumite film has improved adhesion and uniformity, and the formation of this film can be controlled by selecting electrolytic conditions and a period of time. Therefore, the film thickness can be controlled with facility. In this embodiment, electrolytic conditions are set such that the minimum of the angle characteristic is set in the vicinity of 408 nm. To further form a dielectric film as a protective film on the anodized film, film forming may be performed by well-known vapor deposition or dipping.

In this embodiment, aluminum is used not only to form the first metallic film layer on the polygon mirror 5 but also to form the base member. Thus, it is possible to reduce the manufacturing cost by eliminating the need for the step of forming a metallic reflecting film on the base member. It is also possible to satisfy the above-described reflectance condition by using a silver film. However, it is desirable to use aluminum rather than silver since silver is high-priced and is susceptible to environmental degradation.

According to the present invention, however, the material of the base member is not limited to metals including aluminum. An insulating material may be used if various characteristic requirements of the polygon mirror are satisfied.

Figure 3A:
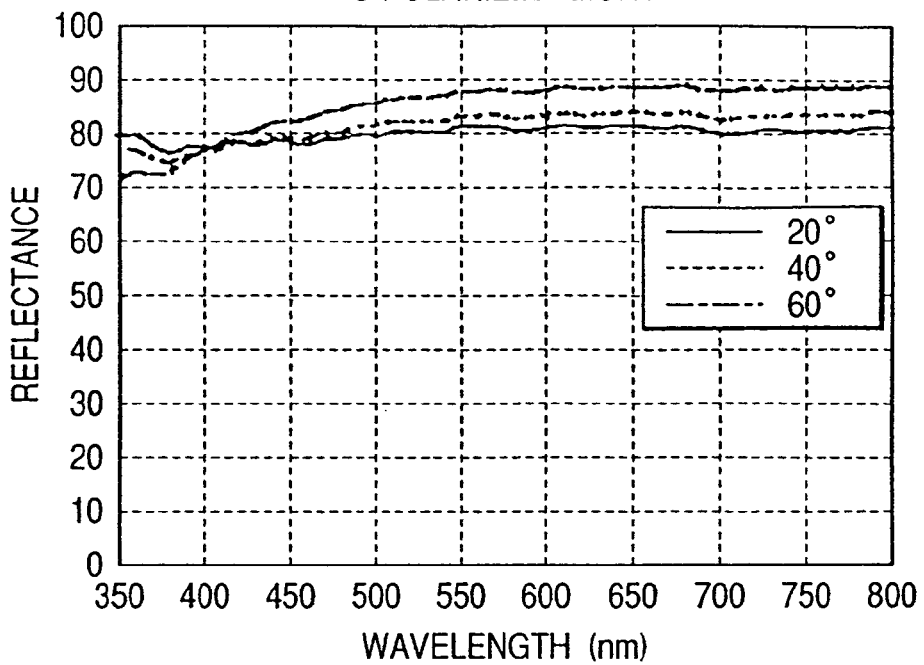
FIGS. 3A and 3B are diagrams showing the spectral reflectance of a polygon mirror having an aluminum film, alumina vapor-deposited on the aluminum film, and a projective film formed on the alumina surface.
Figure 3B:
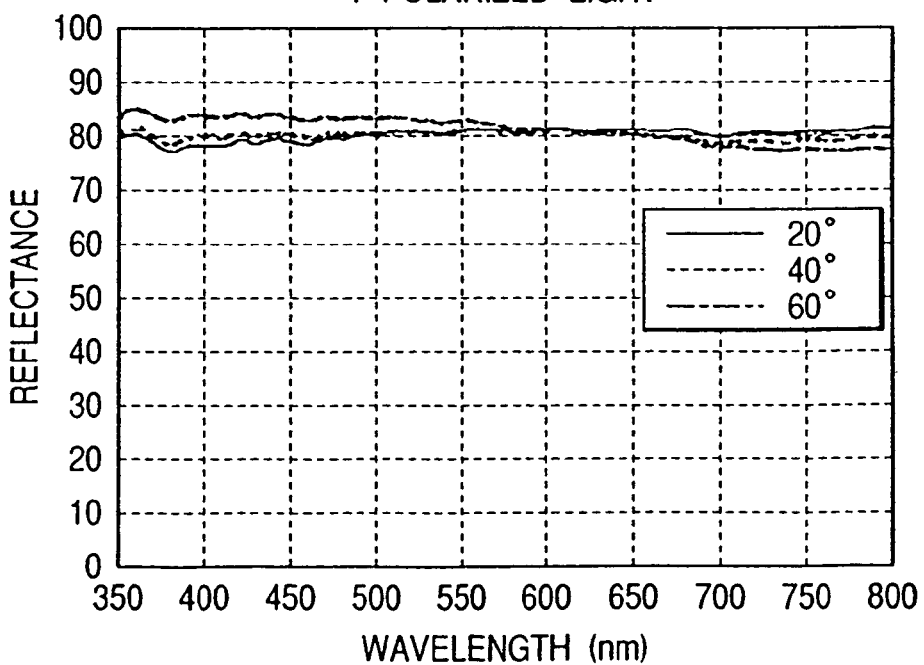

FIGS. 3A and 3B show reflection characteristics of a polygon mirror formed by vapor-depositing on an aluminum film a film of alumina ($Al_2O_3$) having the function of reducing angle dependence, and forming a protective film (dielectric film) on the alumina film. Such a film structure is effective in reducing the angle dependence of the polygon mirror with respect to P-polarized light and S-polarized light and in improving the durability.

Second Embodiment

Figure 4:
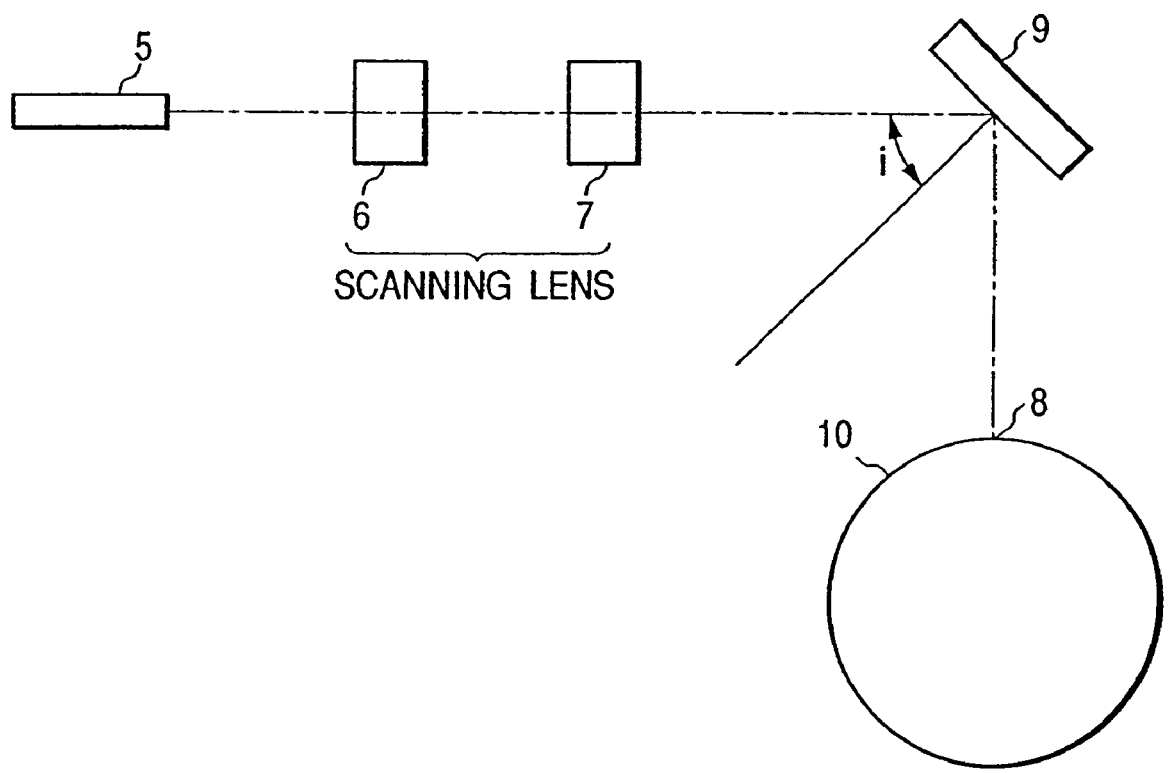
FIG. 4 is a schematic cross-sectional view of an essential portion of an optical scanning apparatus which represents a second embodiment of the present invention.

FIG. 4 is a schematic cross-sectional view along a sub-scanning direction of an essential portion of an optical scanning apparatus which represents a second embodiment of the present invention. The incidence optical system (not shown) from the semiconductor laser to the polygon mirror is the same as that in the first embodiment. In many cases of use of optical scanning apparatuses in image forming apparatuses, the scanning light beam is bent in the sub-scanning direction for some reason relating to the layout of units of the image forming apparatus. In this embodiment, the light beam moved for scanning along a horizontal direction passes through scanning lenses 6 and 7 and is perpendicularly bent one time by a bending mirror 9 to travel to a photosensitive drum 10. Ordinarily, a mirror used like the bending mirror 9 has a metallic film vapor-deposited on a surface of a glass base member. In this embodiment, aluminum is vapor-deposited as described above to achieve the effect of obtaining a sufficient quantity of light even when a light source of 500 nm or less is used.

Figure 5A:
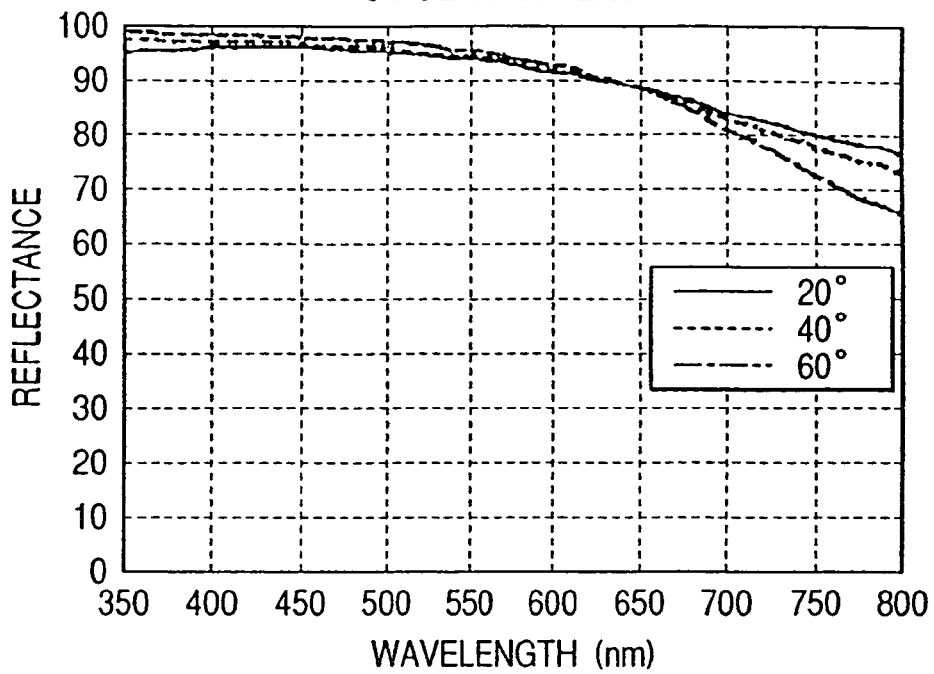
FIGS. 5A and 5B are diagrams showing the spectral reflectance of a mirror having an aluminum film, and a dielectric film formed by vapor-deposition on the aluminum film.
Figure 5B:
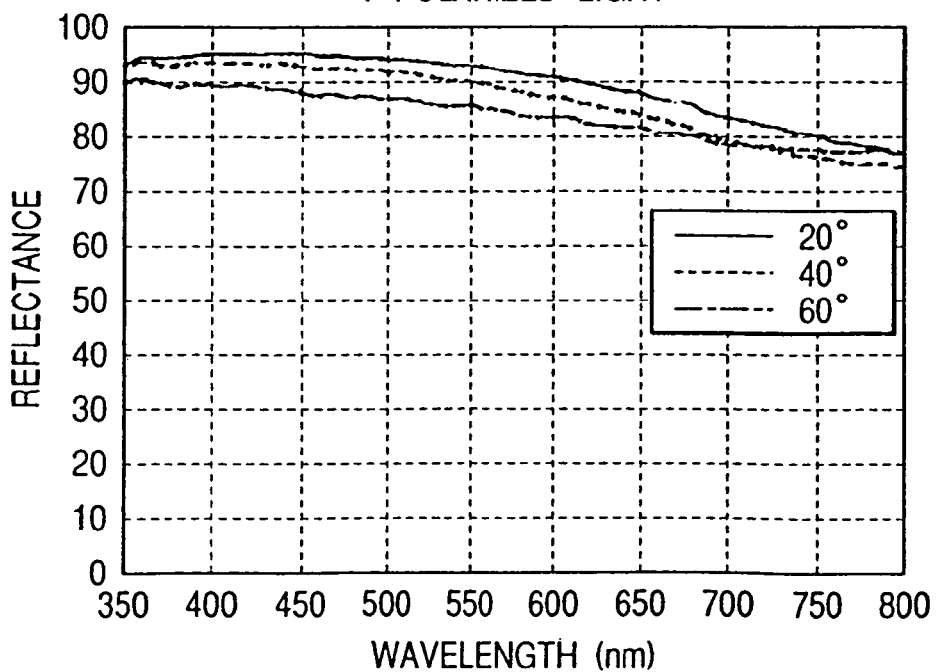

It is effective to vapor-deposit a dielectric film on the aluminum film as a means for further increasing the reflectance. FIGS. 5A and 5B show the spectral reflectance of a mirror having $MgF_2$ film and $ZrO_2$ film vapor-deposited on aluminum film. The reflectance is increased by several percent in comparison with that in the case of the single-aluminum-layer structure shown in FIGS. 2A and 2B. To form a mirror having a higher reflectance, multiple layers may be provided by alternately forming a low-refractive index film and a high-refractive index film.

While use of an aluminum film in the embodiment has been described, any other metallic film may be effectively used according to the present invention if the film satisfies the condition $k > \sqrt{(-n^2 + 18n - 1)}$.

Each of the scanning lenses 6 and 7 used in this embodiment may be made of either glass or a plastic. However, if the lens is made of a plastic, it is preferred that the lens satisfy conditions described below with respect to the fourth or fifth embodiment: $Lmax - Lmin < 3° \log_{10} 0.93/S$, and $S = \log_{10}(1 - 3.55 \times 10^8/\lambda^4)$, where $\lambda$ is the wavelength (nm) of the light beam.

It is also preferred that the lens alternatively satisfy the condition $Lmax - Lmin < 10.0$ (mm).

Also, at least one of a bending mirror, a filter and an optical thin film vapor-deposited on an optical member, each of which is a member for correcting light quantity distribution nonuniformity in the sixth embodiment, may be used in this embodiment.

Further, an optical member in the seventh embodiment having a characteristic (e.g., reflectance b of a bending mirror) similar to the inverse of the transmittance spectral characteristic of the optical resin may be used. This optical member having a characteristic similar to the inverse of the transmittance spectral characteristic of the optical resin may be a bending mirror, a filter, or an optical thin film vapor-deposited on an optical member.

Third Embodiment

Figure 6:
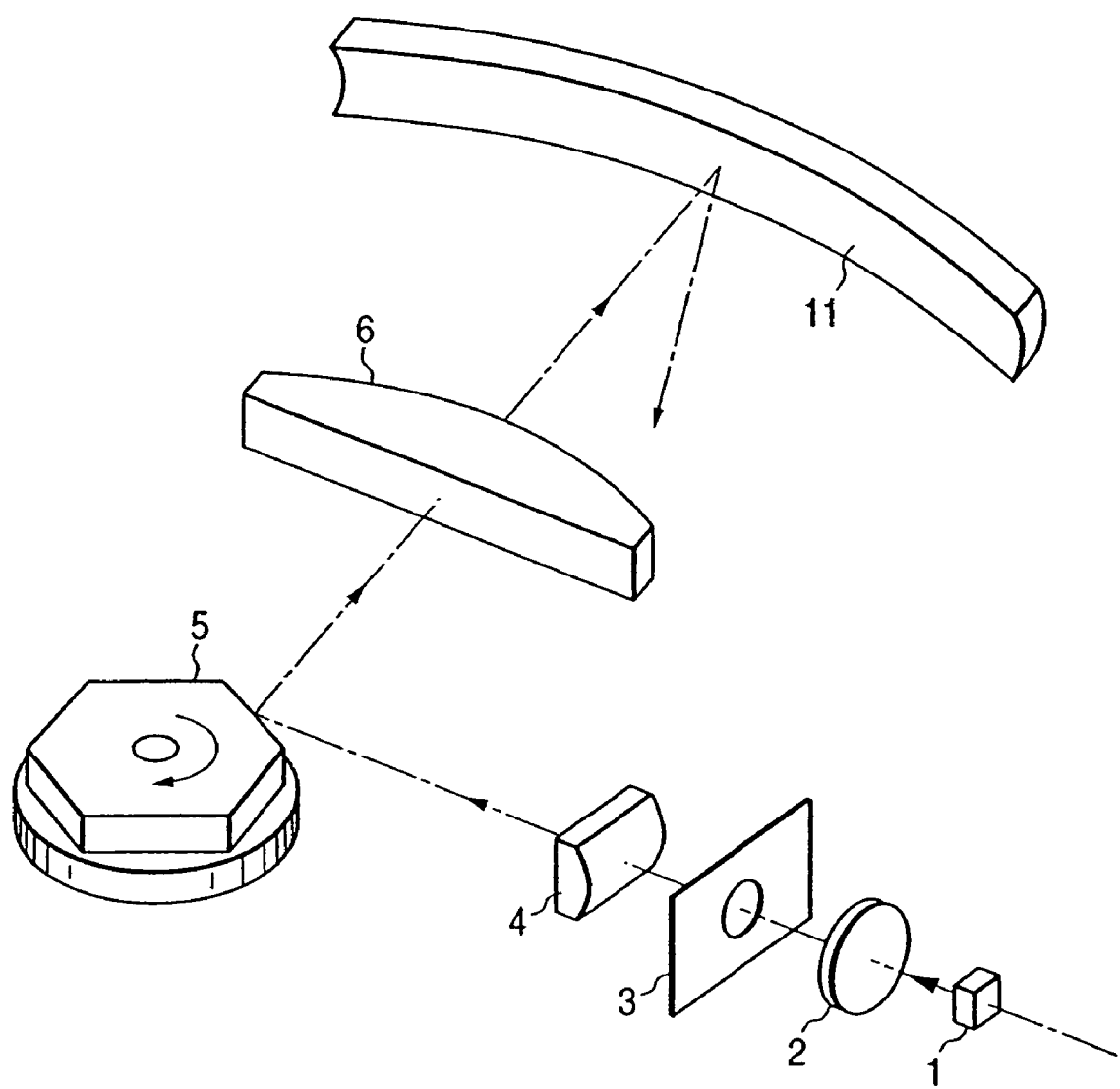
FIG. 6 is a perspective view of an optical scanning apparatus which represents a third embodiment of the present invention.

FIG. 6 is a perspective view of an optical scanning apparatus which represents a third embodiment of the present invention. This embodiment differs from the first or second embodiment in that a scan-imaging mirror 11 is used instead of the scanning lens 7. As scan-imaging mirror 11, a cylindrical mirror, a spherical mirror, or a lens with a freely curved surface, recently put to use with improvements in plastic forming techniques, may be used. The advantage of use of the scan-imaging mirror 11 in the scan-imaging system resides in its having both an imaging lens function and a bending mirror function. Therefore, it is possible to remove the bending mirror described with respect to the second embodiment. That is, a reduction in manufacturing cost can be achieved by reducing the number of components.

The scanning lens 6 used in this embodiment may be made of either glass or a plastic. However, if the lens is made of a plastic, it is preferred that the lens satisfy conditions described below with respect to the fourth or fifth embodiment: Lmax−Lmin<3°log$_{10}$0.93/S, and S=log$_{10}$(1−3.55× 10$^8$/λ$^4$), where λ is the wavelength (nm) of the light beam.

It is also preferred that the lens alternatively satisfy the condition Lmax−Lmin<10.0 (mm).

Also, at least one of a bending mirror, a filter and an optical thin film vapor-deposited on an optical member, each of which is a member for correcting light quantity distribution nonuniformity in the sixth embodiment, may be used in this embodiment.

Further, an optical member in the seventh embodiment having a characteristic (e.g., reflectance b of a bending mirror) similar to the inverse of the transmittance spectral characteristic of the optical resin may be used. This optical member having a characteristic similar to the inverse of the transmittance spectral characteristic of the optical resin may be a bending mirror, a filter, or an optical thin film vapor-deposited on an optical member.

Also in this embodiment, an aluminum film is used on the scan-imaging mirror to obtain a sufficient quantity of light even if a light source of 500 nm or less is used.

While use of an aluminum film in each embodiment has been described, any other metallic film may be effectively used according to the present invention if the film satisfies the condition $k > \sqrt{(-n^2+18n-1)}$.

From consideration of the reflectance characteristics shown in FIGS. 2A, 2B, 3A, 3B, 5A and 5B, it is said that the lower limit of the wavelength of the light sources used in the first to third embodiments of the present invention is preferably 380 nm or greater.

The semiconductor laser 1 in the embodiments of the present invention may be of a multibeam type capable of producing two or more beams.

Fourth Embodiment

Figure 10:
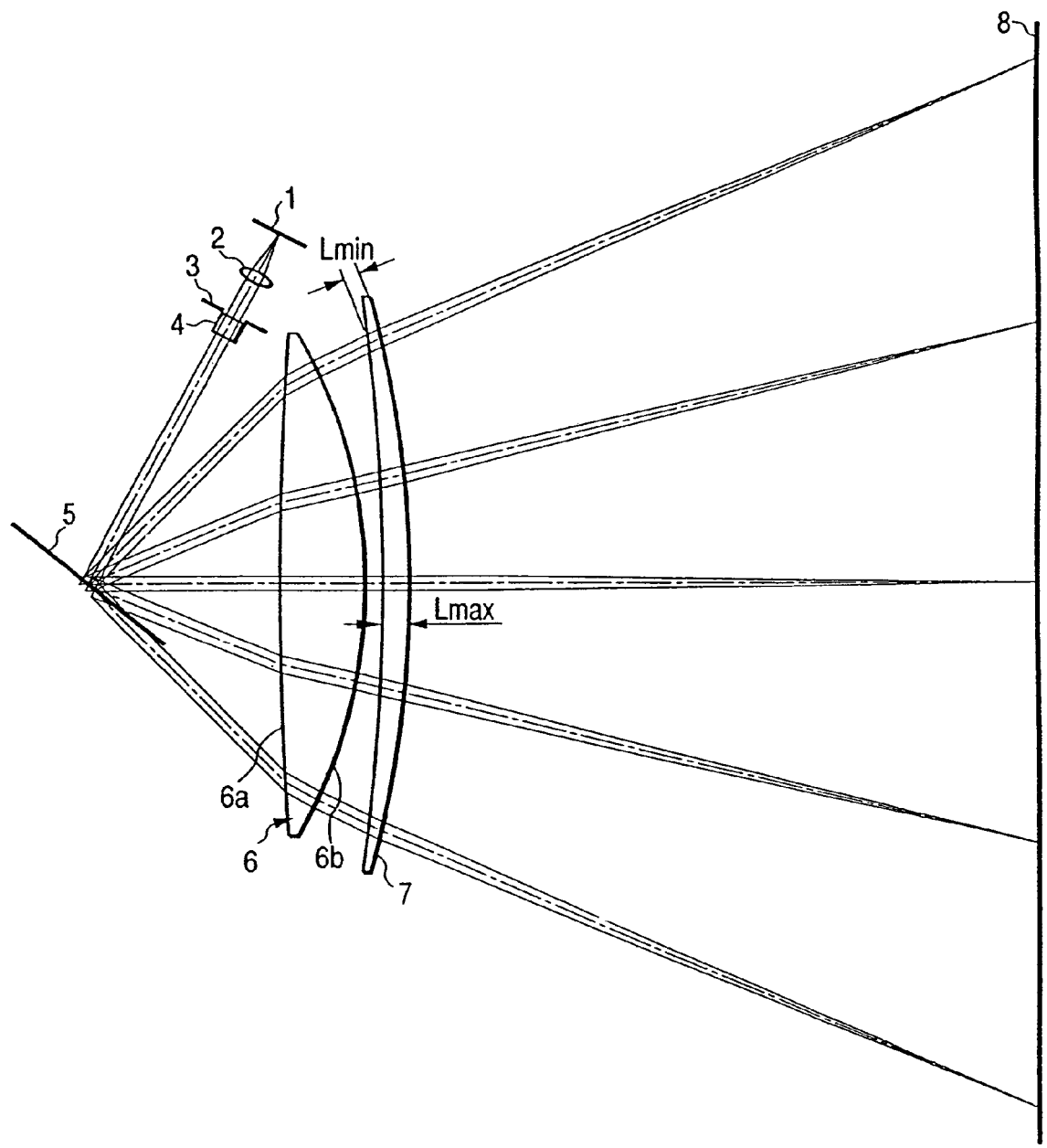
FIG. 10 is a schematic cross-sectional view of an essential portion of an optical scanning apparatus which represents a fourth embodiment of the present invention.

FIG. 10 is a schematic cross-sectional view of an essential portion of an optical scanning apparatus in which features of the present invention are best shown. Divergent rays of light from a semiconductor laser 1, i.e., a light source, are converted into an approximately parallel beam by a collimator lens 2 and the diameter of the beam is reduced by an aperture 3 to obtain a desired spot diameter. The semiconductor laser 1 used in this embodiment is a gallium nitride semiconductor laser having an oscillation wavelength of 408 nm. A rotary polygon mirror 5 is provided which reflects the light beam from the light source so that the light beam travels to a surface 8 to be scanned. The reflected light beam from the polygon mirror 5 passes through scanning lenses 6 and 7 to form a small light spot at any point in the entire scanning area. It is required that the scanning lenses 6 and 7 have an fθ characteristic such that the light beam deflected at a constant angular velocity by the polygon mirror 5 is converted into a light beam moving at a constant distance speed. Further, the parallel light beam is temporarily condensed on the polygon mirror 5 along a sub-scanning direction by a cylindrical lens 4, and the polygon mirror 5 and the surface 8 to be scanned are set in an optically conjugate relationship with each other at a sub-scanning cross section, thereby enabling correction of surface tilt of the polygon mirror 5.

The scanning lenses 6 and 7 used in this embodiment will be described in detail. The scanning lens 6 is a glass lens made of a glass material BSL-7 (a product from Ohara Inc.) and having antireflection coating films vapor-deposited on surfaces 6a and 6b through which the light beam passes. The scanning lens 7 is a plastic lens formed by injection molding of an optical resin ZEONEX480 (a product from ZEON CORPORATION).

The transmittance of an optical member is considered to be separated into a surface reflection component P (reflection coefficient) and an internal transmittance τ.

Total transmittance $T(\lambda)=P(\lambda)\times\tau(\lambda)$ (1)

The reflection coefficient P depends on the refractive index n(λ) of the optical member and is expressed by the following equation:

Reflection coefficient $P(\lambda)=2°n(\lambda)/(n(\lambda)^2+1)$ (2)

Also, the internal transmittance depends on the thickness t of the optical member and the following equation is established according to the Lambert's law.

Internal transmittance $\tau_2(\lambda)=\tau_1(\lambda)^{t2/t1}$ (3)

Figure 7:
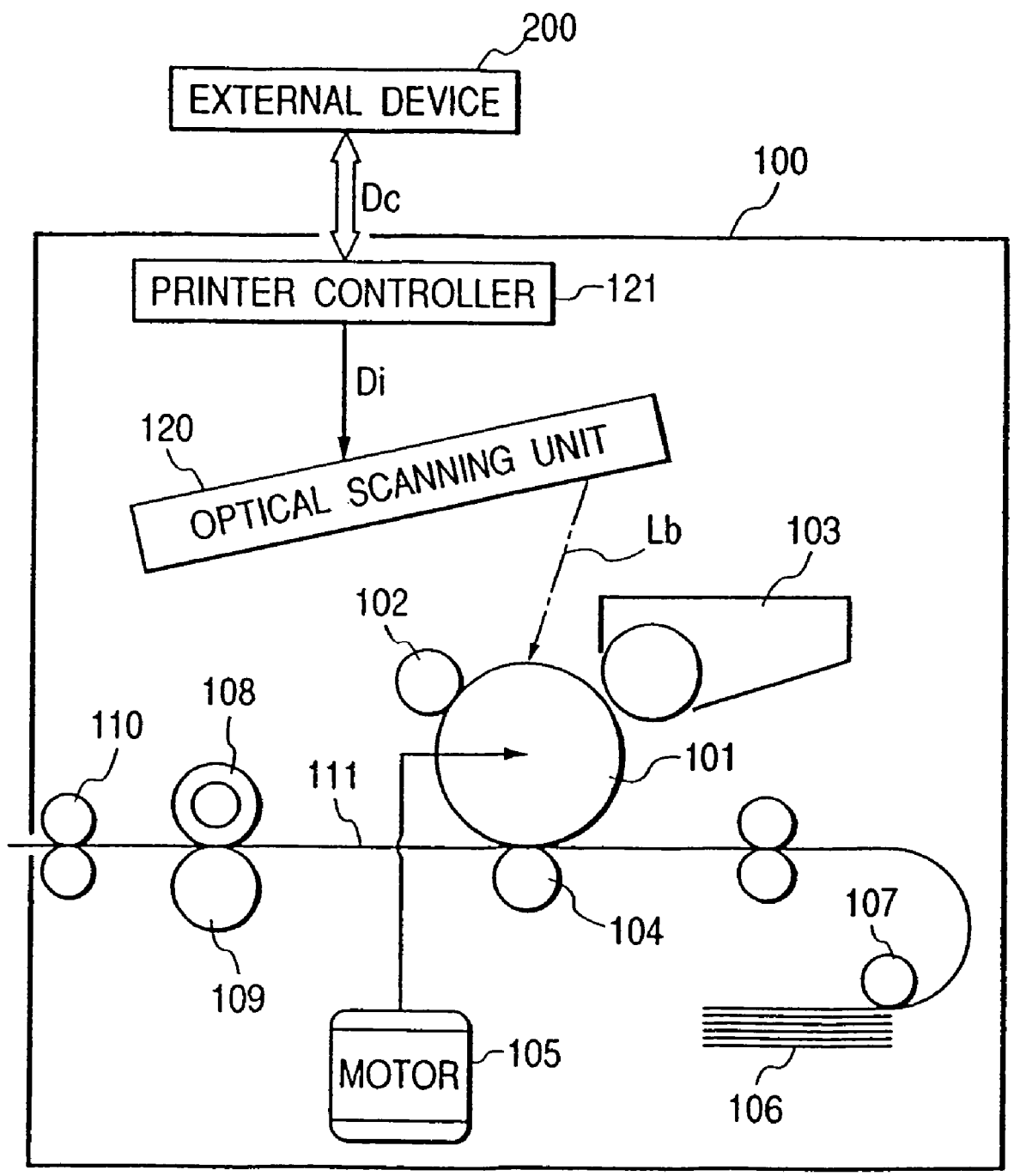
FIG. 7 is a schematic cross-sectional view along a sub-scanning direction of an essential portion of an image forming apparatus in accordance with the present invention.
Figure 8A:
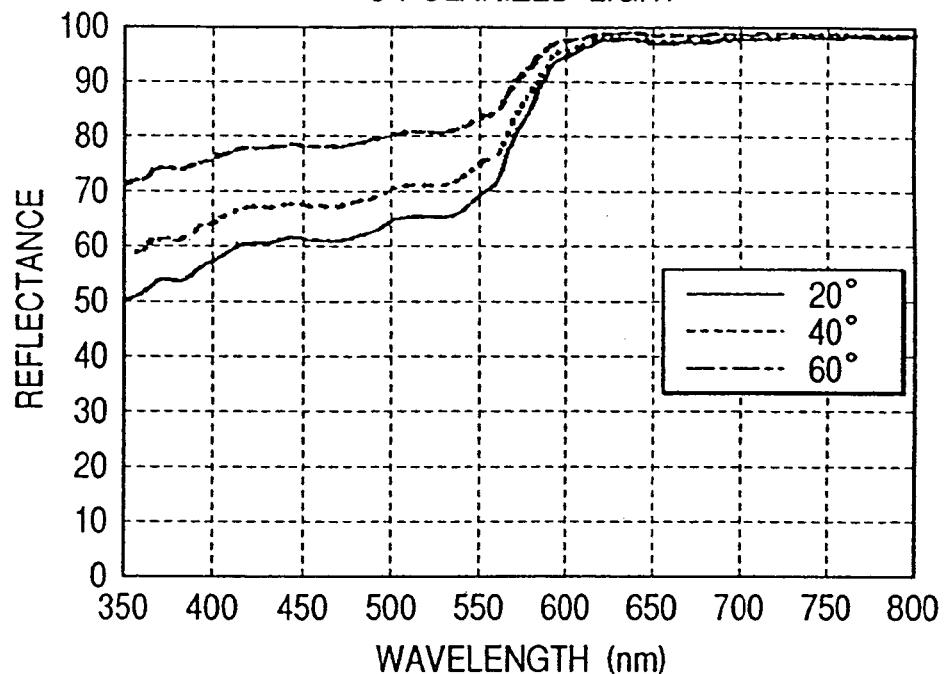
FIGS. 8A and 8B are diagrams showing the spectral reflectance of a copper mirror.
Figure 8B:
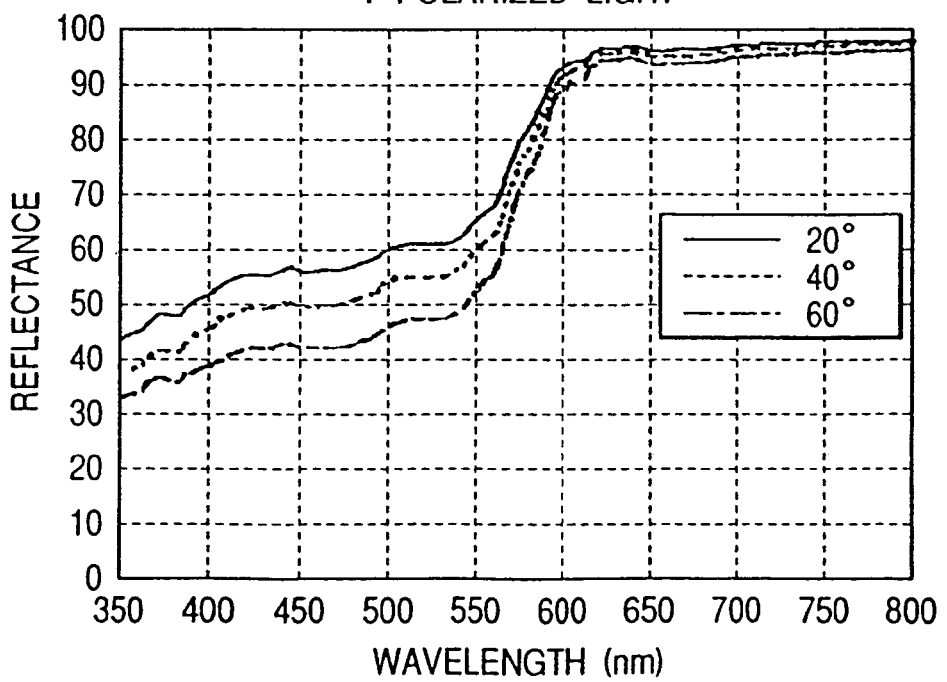
Figure 9A:
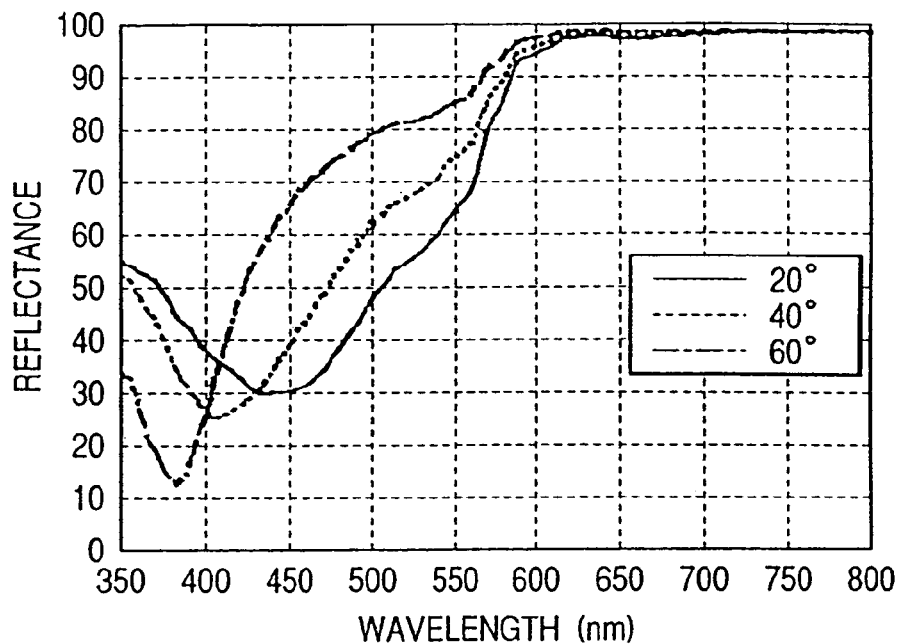
FIGS. 9A and 9B are diagrams showing the spectral reflectance of copper+alumina+SiO$_2$.
Figure 9B:
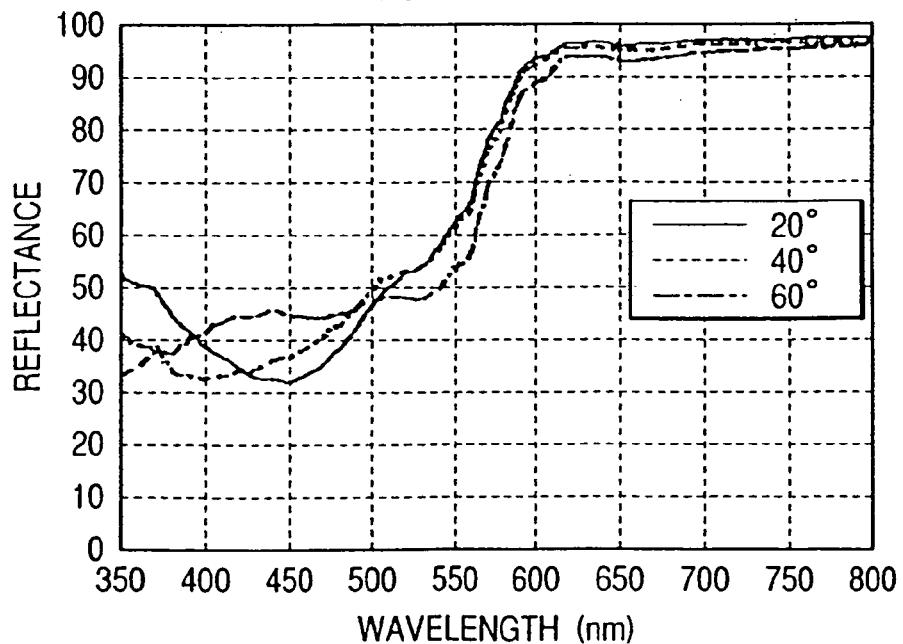

ZEONEX480 has a refractive index n(408 nm)=1.5402, and its total transmittance when the thickness is 3 mm is $T_0$(408 nm)=0.902 from the graph of FIG. 7. From these values, the internal transmittance $\tau_0$(408 nm)=0.987 is obtained.

If the maximum ray passage distance of the plastic lens is Lmax and the minimum ray passage distance is Lmin, $\tau_1(408 \text{ nm})=\tau_0(408 \text{ nm})^{Lmax/3}$ $\tau_2(408 \text{ nm})=\tau_0(408 \text{ nm})^{Lmin/3}$ $T_1/T_2=\tau_1(408 \text{ nm})/\tau_2(408 \text{ nm})=\tau_0(408 \text{ nm})^{(Lmax-Lmin)/3}$ Therefore, the transmittance ratio depends on the distance between the ray passage distances. In this embodiment, Lmax=7.50 (mm) and Lmin=3.21 (mm). Therefore, $T_1/T_2$=0.981, and it is possible to limit variation in the quantity of light due to internal absorption to a small level, 1.9%.

According to the result of a study made by the inventor, if Lmax−Lmin<3°log$_{10}$0.93/S, and S=log$_{10}$(1−3.55×10$^8$/λ$^4$), where λ is the wavelength (nm) of the light beam, it is possible to limit variation in the quantity of light due to internal absorption in the plastic lens to a sufficiently small value in practice.

Further, according to the result of the study made by the inventor, if Lmax−Lmin<10.0 (mm), it is possible to limit variation in the quantity of light due to internal absorption in the plastic lens to a sufficiently small value in practice.

Fifth Embodiment

Figure 11:
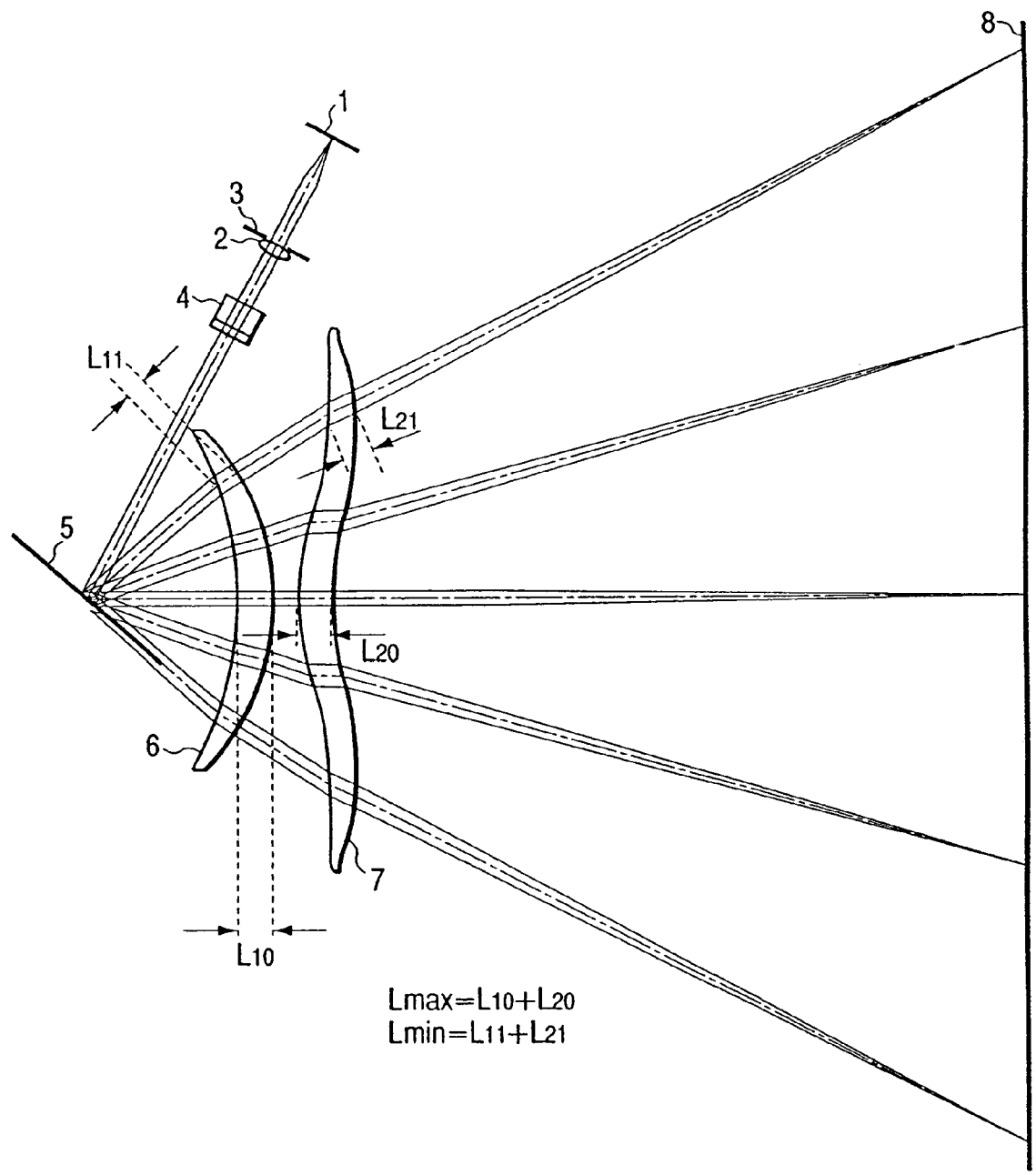
FIG. 11 is a schematic cross-sectional view of an essential portion of an optical scanning apparatus which represents a fifth embodiment of the present invention.

FIG. 11 is a diagram showing the fifth embodiment of the present invention. The fifth embodiment differs from the fourth embodiment in that two injection-molded plastic lenses. With the recent tendencies to develop laser printers of lower prices, schemes have been put forth to reduce the manufacturing cost of laser scanner units. Plastic lenses can be manufactured at a lower cost and can be formed with a surface in a freely curved shape, which cannot be attained in glass lenses. Therefore, plastic lenses also have an advantage over glass lenses in terms of correction of aberrations.

In this embodiment, the shapes of the two plastic lenses are optimized to achieve the effect of setting the polygon mirror and the surface to be scanned in a conjugate relationship, the effect of obtaining a scanning beam with an fθ characteristic and the effect of suitably correcting the curvature of field. However, since two plastic lenses are used, the total length of paths in the lenses through which rays travel is increased relative to that in the case where one plastic lens is used as in the fourth embodiment.

In this embodiment, the thickness of each plastic lens is set so as to satisfy the above-described conditional inequality relating to the difference between the ray passage distances. In this embodiment $Lmax=L_{10}+L_{20}$ and $Lmin=L_{11}+L_{21}$. The maximum of the total ray passage distance of the two plastic lenses (material: ZEONEX480) is Lmax=18.10 (mm), the minimum of the total ray passage distance thereof is Lmin=12.33 (mm), and $T_1/T_2=0.976$. Thus, variation in the quantity of light due to internal absorption can be limited to a small value, i.e., 2.4%, even though the two plastic lenses are used.

Sixth Embodiment

Figure 12:
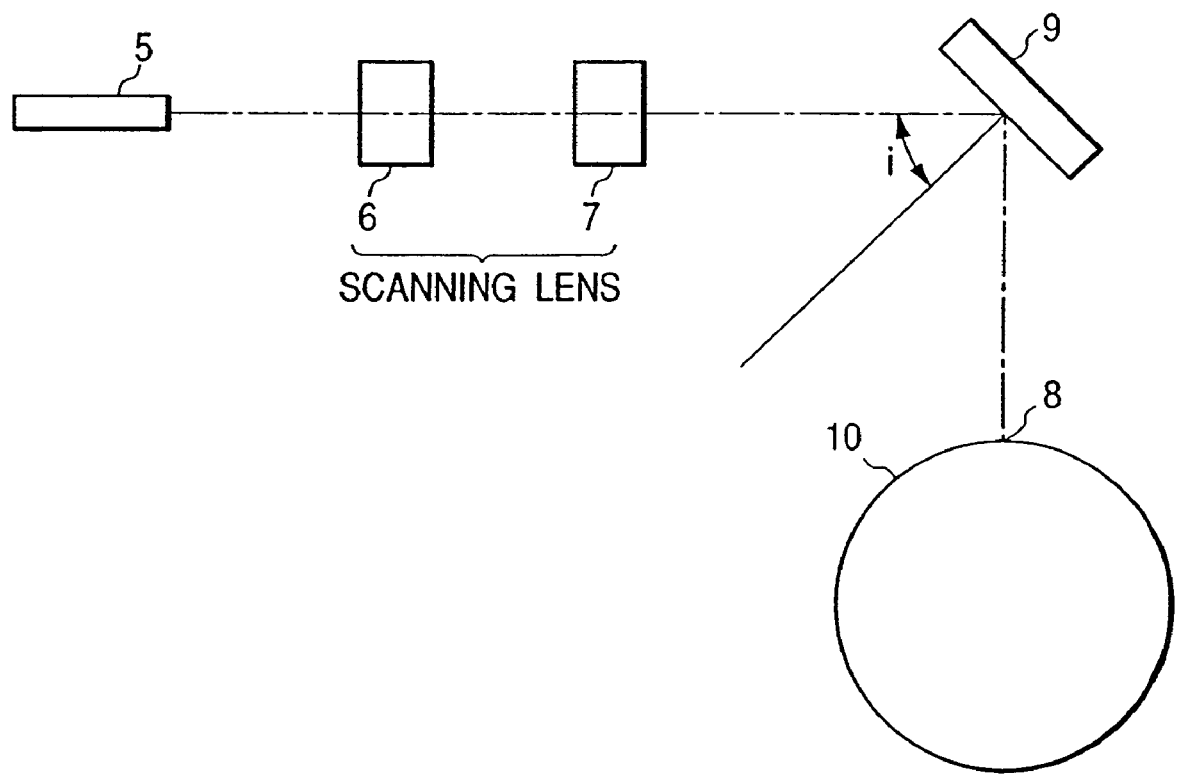
FIG. 12 is a schematic cross-sectional view of an essential portion of an optical scanning apparatus which represents a sixth embodiment of the present invention.

FIG. 12 is a schematic cross-sectional view showing a sub-scanning system of an optical scanning apparatus which represents a sixth embodiment of the present invention. The scanning optical system in this embodiment uses two scanning lenses, and at least one of these lenses is a plastic lens. In this embodiment, by considering changes in an incident angle i of incidence on the bending mirror 9 with respect to different scanning angles, the optical system is designed so that if, for example, the ray passage distance of the plastic lens at a scanning center is longer than that at a scanning end (as in the fourth embodiment), the reflectance of the bending mirror decreases with the increase in incident angle i (see FIG. 13), thereby reducing the total amount of variation in distribution of the quantity of light on the scanned surface.

Figure 13:
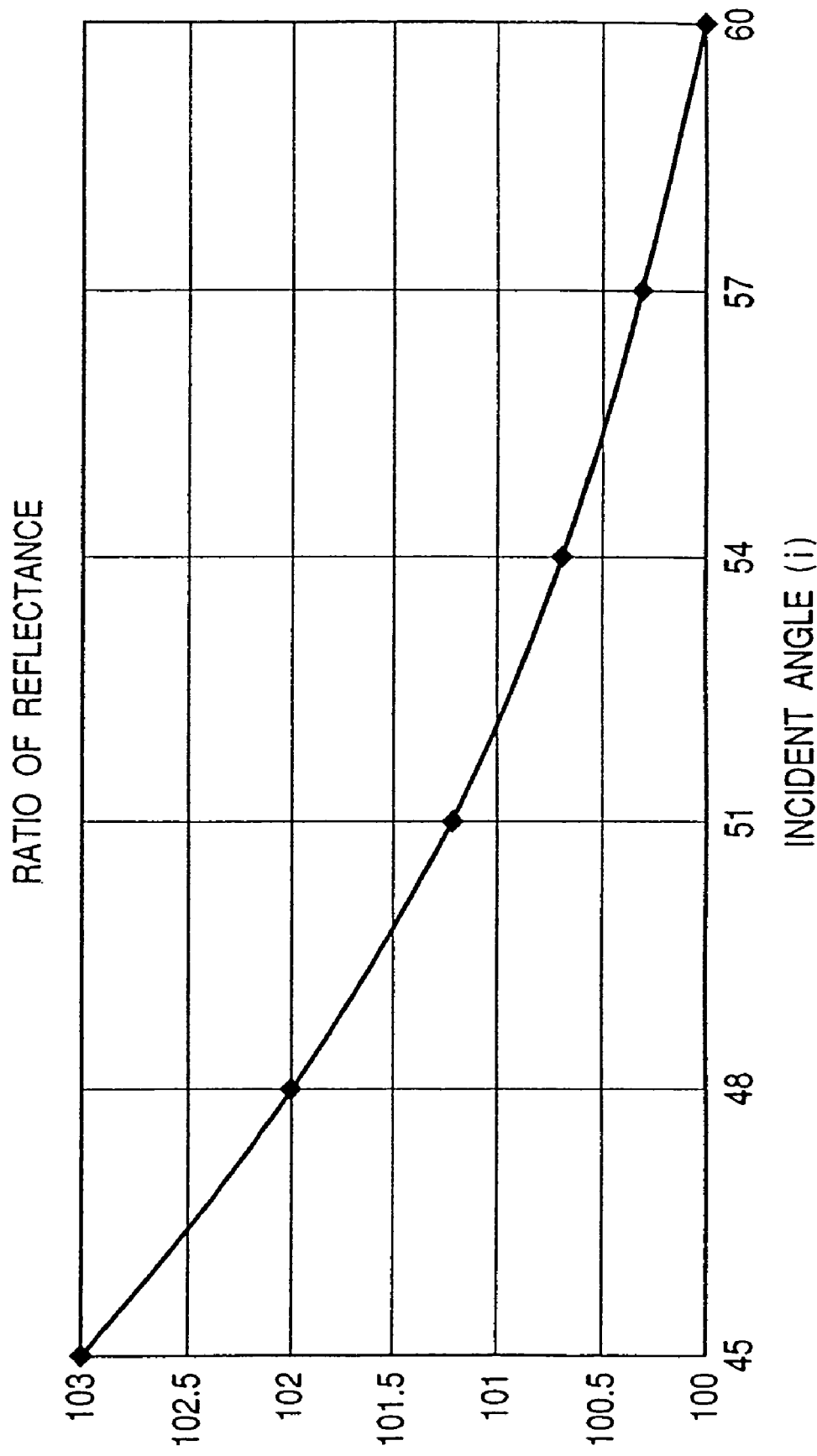
FIG. 13 is a diagram showing the reflectance ratio and an angle characteristic of a bending mirror.

The ordinate of FIG. 13 represents the reflectance ratio (%), i.e., the value of a fraction in which the denominator is the reflectance at an incident angle of 60° while the numerator is an arbitrary incident angle.

As a correcting member for correcting light quantity distribution nonuniformity other than the bending mirror, a filter, an optical thin film vapor-deposited on an optical member, or the like may be used to achieve the above-described effect.

Seventh Embodiment

Figure 14:
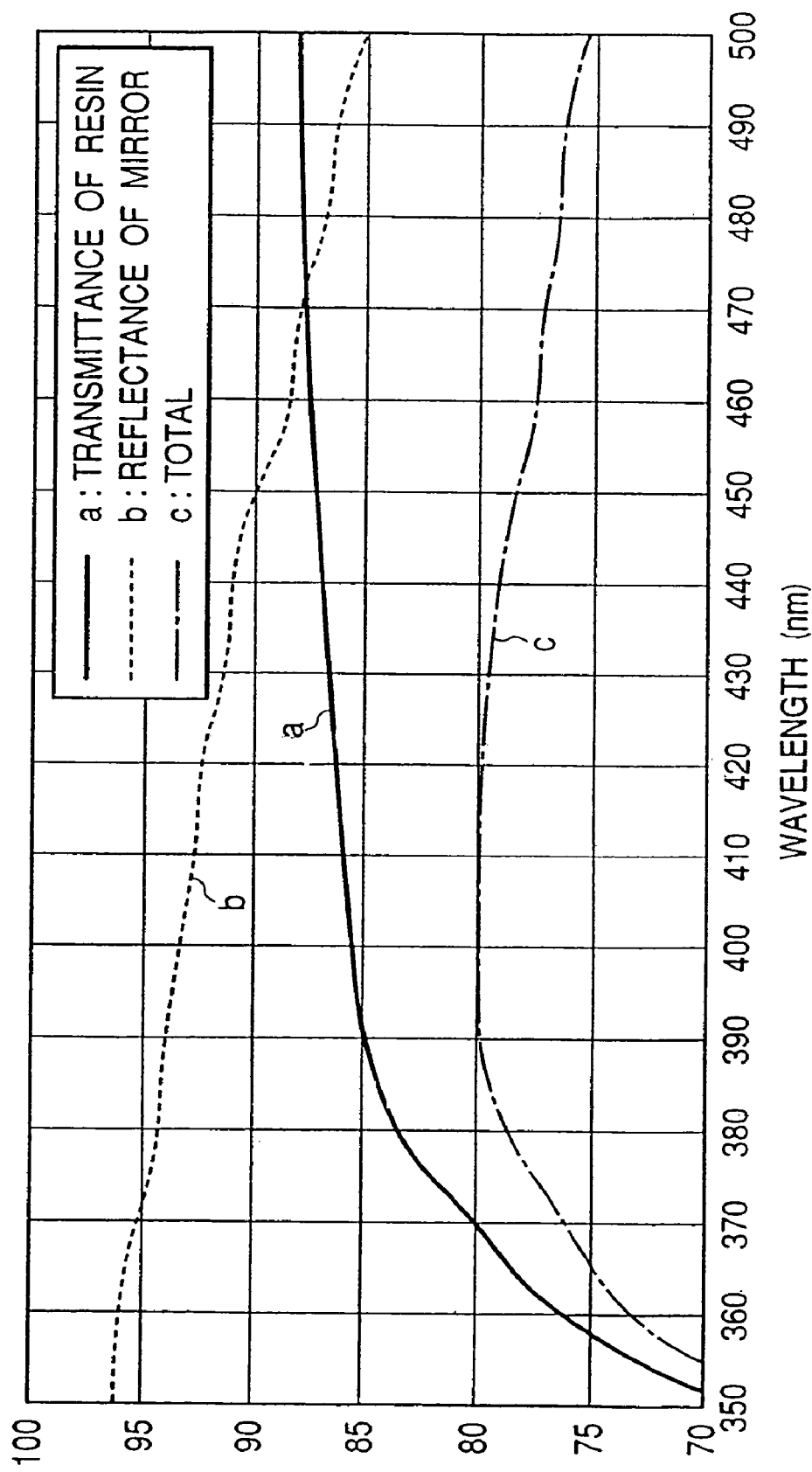
FIG. 14 is a diagram showing the reflectance-wavelength characteristics of a bending mirror.

FIG. 14 is a graph showing spectral characteristics of an optical resin and a mirror for explaining a seventh embodiment of the present invention. As mentioned above, in use of a semiconductor laser as a light source in a certain operational environment, variation in wavelength is inevitable because of a temperature-dependent oscillation wavelength characteristic of the laser. Therefore, it is required that variations in the optical characteristics, i.e., the transmittance, the reflectance, etc., of optical components used in the scanning optical system be small in the vicinity of the laser oscillation wavelength.

A case where polycarbonate (PC) produced by Teijin Chemicals Ltd. is used will be described by way of example. A semiconductor laser used as a light source is a gallium nitride semiconductor laser having an oscillation wavelength of 408 nm. Assuming that in an operational environment there are wavelength variations of ±10 nm on 408 nm, variation in the quantity of light due to the optical resin is about 1.0%, as represented by resin transmittance a shown in FIG. 14. However, it is possible to limit the total variation ratio c in the quantity of light to approximately $\frac{1}{20}$ of resin transmittance a by using an optical member having a characteristic (e.g., reflectance b of a bending mirror) similar to the inverse of the transmittance spectral characteristic of the optical resin. As an optical member having a characteristic similar to the inverse of the transmittance spectral characteristic of the optical resin, in addition to a bending mirror, a filter, an optical thin film vapor-deposited on an optical member, or the like may be used to achieve the above-described effect.

The optical resin used in the fourth to seventh embodiments is only an example of the resin material and the present invention is not limited to particular optical resins. In other optical resins, the transmittance may be reduced due to internal absorption with decreasing wavelength. By any application of the present invention to optical systems using such optical resins, the same effect can also be achieved according to the present invention.

Figure 15:
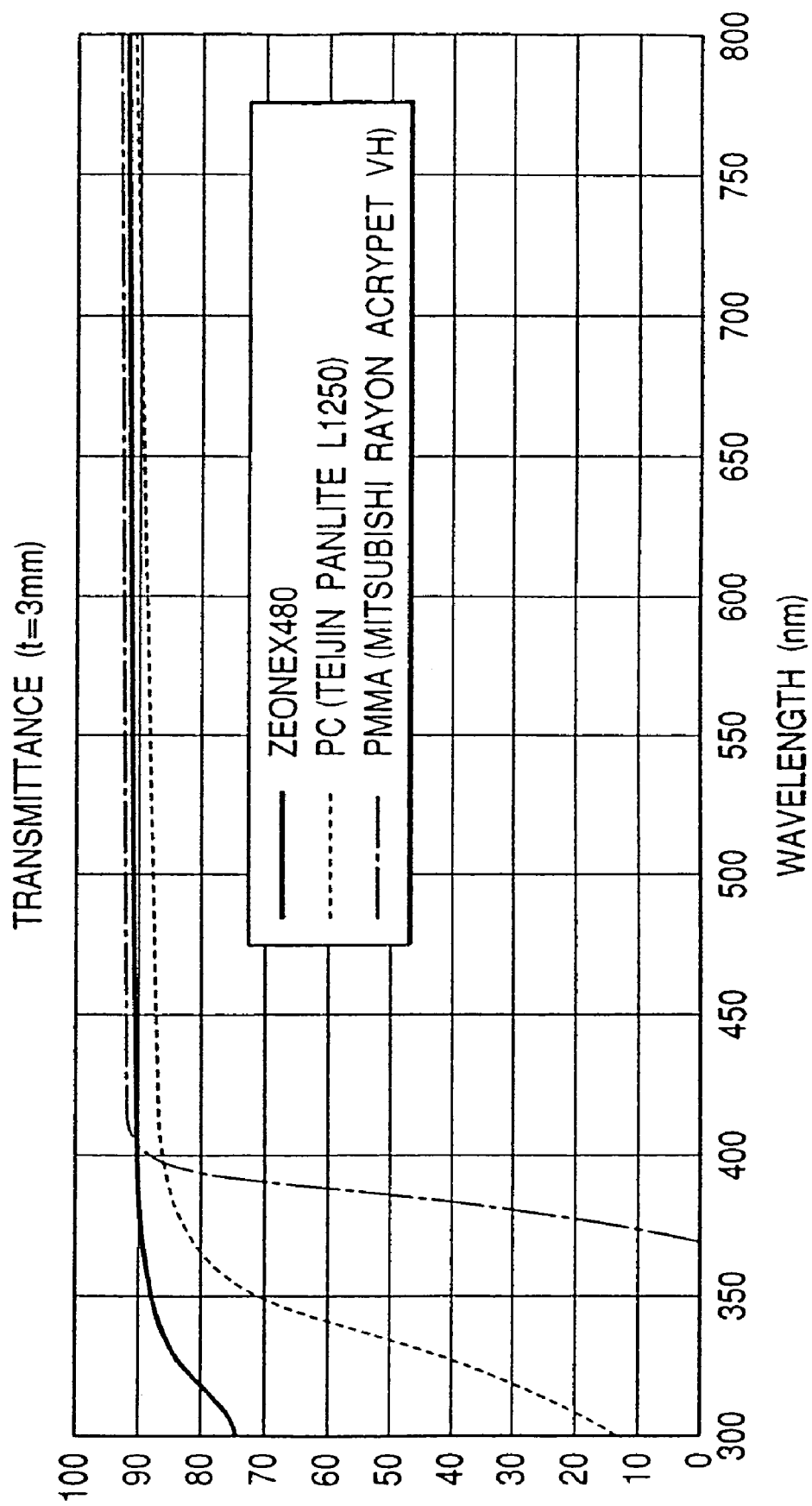
FIG. 15 is a diagram showing transmittance-wavelength characteristics of typical optical resins.

In consideration of the reflectance characteristics shown in FIGS. 14 and 15, it is said that the lower limit of the wavelength of the light sources used in the fourth to seventh embodiments of the present invention is preferably 380 nm or greater.

The number of plastic lenses constituting each of the scanning optical systems used in the fourth to seventh embodiments of the present invention may be three or more.

The semiconductor laser 1 serving as a light source, which is used in the fourth to seventh embodiments of the present invention may be of a multibeam type capable of producing two or more beams. If the combined system of the scanning optical system has a positive power in each of the main scanning and sub-scanning directions (for imaging on the surface to be scanned), the power of each single plastic lens may be either positive or negative.

FIG. 7 is a schematic cross-sectional view along a sub-scanning direction of an essential portion of an image forming apparatus 100 using the optical scanning apparatus in accordance with the present invention. To the image forming apparatus 100, code data Dc from an external device 200 such as a personal computer is input. This code data Dc is converted into image data (dot data) Di by a printer controller 121 in the image forming apparatus 100. This image data Di is input to an optical scanning unit 120 of the construction described above with respect to one of the first to seventh embodiments. A light beam Lb modulated according to image data Di is emitted from the optical scanning unit 120. A photosensitive surface of a photosensitive drum 101 is scanned with this light beam Lb in a main scanning direction.

The photosensitive drum 101, which is an electrostatic latent image bearing member (photosensitive member) is rotated clockwise by a motor 105. With this rotation, the photosensitive surface of the photosensitive drum 101 is moved relative to the light beam Lb along the sub-scanning direction perpendicular to the main scanning direction. A charging roller 102 for uniformly charging the surface of the photosensitive drum 101 is disposed above the photosensitive drum 101 so as to contact the surface of the same. The surface of the photosensitive drum 101 charged by the charging roller 102 is irradiated with the light beam Lb moved for scanning by the optical scanning unit 120.

As mentioned above, the light beam Lb is modulated on the basis of image data Di. By irradiation with this light beam Lb, an electrostatic latent image is formed on the surface of the photosensitive drum 101. This electrostatic latent image is developed as a toner image by a development device 103 which is disposed on the downstream side of the light beam Lb irradiation position in the direction of rotation of the photosensitive drum 101 so as to contact the photosensitive drum 101.

The toner image developed by the development device 103 is transferred onto a paper sheet 111 provided as a transfer member by a transfer roller 104 which is placed below the photosensitive drum 101 so as to face the same. Paper sheets 111 are accommodated in a paper cassette 106 provided in front (on the right-hand side as viewed in FIG. 7) of the photosensitive drum 101. Alternatively, paper sheet 111 may be manually inserted therein. A sheet feed roller 107 is disposed at an end of the paper cassette 106 and is operated to feed each paper sheet 111 from the paper cassette 106 into a conveyance path.

As described above, paper sheet 111 onto which the unfixed toner image has been transferred is further transported to a fixing device provided at the rear (on the left-hand side as viewed in FIG. 7) of the photosensitive drum 101. The fixing device is constituted by a fixing roller 108 having an internal fixing heater (not shown) and a pressure roller 109 placed so as to be maintained in pressure contact with the fixing roller 108. The unfixed toner image on the paper sheet 111 transported from the transfer portion is fixed while being pressed and heated at the pressure contact portions of the fixing roller 108 and the pressure roller 109. Further, a sheet discharge roller 110 is provided at the rear of the fixing roller 108. The sheet discharge roller 110 discharges the paper sheet 111 with the fixed image out of the image forming apparatus 100.

Although not shown in FIG. 7, the printer controller 121 not only converts data as described above but also controls, for example, the motor 105, internal components of the image forming apparatus 100, a polygon mirror motor in the optical scanning unit 120.

According to the present invention, as described above, in the scanning optical system in which the wavelength of the light source is 500 nm or less and a metallic reflecting mirror is provided, a suitable metallic material for the metallic reflecting mirror is selected to increase the absolute reflectance and to improve the wavelength dependent characteristic and the angle characteristic of the reflectance.

Thus, it is possible to obtain a sufficient quantity of light required on the surface to be scanned without imposing an excessive load on the semiconductor laser and without using an increased number of collimator lenses. It is also possible to reduce nonuniformity of distribution of the quantity of light on the surface to be scanned and to stabilize the quantity of light even when the wavelength of the light source changes in an operational environment.

According to the present invention, as described above, in the scanning optical system in which the wavelength of the light source is 500 nm or less and at least one plastic lens is provided, a restriction is put on the selection of the thickness of the plastic lens to reduce nonuniformity of distribution of the quantity of light due to internal absorption in the optical resin, thus guaranteeing image density uniformity.

It is also possible to further reduce nonuniformity of distribution of the quantity of light on the surface to be scanned by placing a light quantity distribution nonuniformity correction member such as a reflecting mirror.

Further, by providing an optical component having a characteristic similar to the inverse of the wavelength characteristic of transmittance of the plastic lens, the stability of quantity of light can be improved even when the wavelength of the light source is changed in the operational environment.

What is claimed is:

1. An optical scanning apparatus comprising a light source and a deflection optical system which deflects a light beam from said light source, and an imaging optical system which forms an imaging spot on a surface to be scanned with the light beam from said deflection optical system,
    wherein the wavelength of the light source is 500 nm or less, and
    wherein said imaging optical system includes at least one plastic lens having a spectral characteristic in which transmittance decreases as wavelength shortens, and further includes an optical member having a spectral characteristic in which either transmittance or reflectance increases as wavelength shortens.

2. An optical scanning apparatus according to claim 1, wherein said optical member comprises a reflecting mirror.

3. An optical scanning apparatus according to claim 1, wherein said optical member comprises a filter.

4. An optical scanning apparatus according to claim 1, wherein said optical member comprises an optical thin film.

5. An optical scanning apparatus according to claim 1, wherein said light source comprises a gallium nitride blue-violet semiconductor laser.

6. An optical scanning apparatus according to claim 1, wherein if the maximum and the minimum of the total ray passage distance of said at least one plastic lens according to the deflection angle from the optical axis is Lmax and Lmin, respectively, then Lmax−Lmin<10 mm is satisfied.

7. An image forming apparatus comprising an optical scanning apparatus according to claim 1;
    a photosensitive member disposed at the surface to be scanned of said optical scanning apparatus;
    a development device which develops as a toner image an electrostatic latent image formed on said photosensitive member by a beam of light moved in a scanning manner by said optical scanning apparatus;
    a transfer device which transfers the developed toner image onto a transfer member; and
    a fixation device which fixes the transferred toner image on the transfer member.

8. An optical scanning apparatus according to claim 2, wherein said reflecting mirror is a bending mirror whose reflectance increases as wavelength shortens.

* * * * *

UNITED STATES PATENT AND TRADEMARK OFFICE
CERTIFICATE OF CORRECTION

PATENT NO. : 7,190,498 B2
APPLICATION NO. : 11/294561
DATED : March 13, 2007
INVENTOR(S) : Hidekazu Shimomura It is certified that error appears in the above-identified patent and that said Letters Patent is hereby corrected as shown below:

COLUMN 3
Line 54, "$L_{min}<3°\log_{10} 0.93/S$," should read --$L_{min}<3\bullet\log_{10} 0.93/S$,--.

COLUMN 5
Line 27, "$L_{min}<3°\log_{10} 0.93/S$," should read --$L_{min}<3\bullet\log_{10} 0.93/S$,--.

COLUMN 6
Line 14, "$R=\{n_0-n)^2+k^2\}/\{(n_0+n)^2+k^2\}$" should read --$R=\{(n_0-n)^2+k^2\}/\{(n_0+n)^2+k^2\}$--.

COLUMN 8
Line 33, "$L_{min}<3°\log_{10} 0.93/S$," should read --$L_{min}<3\bullet\log_{10} 0.93/S$,--.

COLUMN 9
Line 5, "$L_{min}<3°\log_{10} 0.93/S$," should read --$L_{min}<3\bullet\log_{10} 0.93/S$,--.

COLUMN 10
Line 15, "Reflection coefficient $P(\lambda)=2°n(\lambda)/n(\lambda)^2+1$" should read --Reflection coefficient $P(\lambda)=2\bullet n(\lambda)/n(\lambda)^2+1$--;
Line 42, "$L_{min}<3°\log_{10} 0.93/S$," should read --$L_{min}<3\bullet\log_{10} 0.93/S$,--; and
Line 57, "that two" should read --that there are two--.

Signed and Sealed this

Eighteenth Day of March, 2008

JON W. DUDAS
*Director of the United States Patent and Trademark Office*